United States Patent
Kang et al.

(10) Patent No.: US 10,170,933 B2
(45) Date of Patent: Jan. 1, 2019

(54) NON-CONTACT TYPE POWER SUPPLYING APPARATUS AND NON-CONTACT TYPE POWER SUPPLYING METHOD

(71) Applicant: Samsung Electro-Mechanics Co., Ltd., Suwon (KR)

(72) Inventors: Chang Soo Kang, Suwon (KR); Soon Tack Oh, Suwon (KR); Chul Gyun Park, Suwon (KR); Jae Suk Sung, Suwon (KR); Hee Sun Han, Suwon (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 568 days.

(21) Appl. No.: 14/543,029

(22) Filed: Nov. 17, 2014

(65) Prior Publication Data

US 2015/0137614 A1 May 21, 2015

(30) Foreign Application Priority Data

Nov. 20, 2013 (KR) .................. 10-2013-0141739
Aug. 26, 2014 (KR) .................. 10-2014-0111863

(51) Int. Cl.
*H02J 50/12* (2016.01)
*H02J 5/00* (2016.01)
(Continued)

(52) U.S. Cl.
CPC .............. *H02J 50/12* (2016.02); *H02J 5/005* (2013.01); *H02J 17/00* (2013.01); *H02J 50/60* (2016.02);
(Continued)

(58) Field of Classification Search
CPC .............. H20J 50/00; H04B 5/00; H02J 50/10
(Continued)

(56) References Cited

U.S. PATENT DOCUMENTS 5,896,278 A * 4/1999 Tamura .................. H01F 38/14
 307/44
8,664,801 B2 * 3/2014 Abe ........................ H02J 7/025
 307/104
(Continued)

FOREIGN PATENT DOCUMENTS

JP 10-215530 8/1998
JP 2002-209344 7/2002
(Continued)

OTHER PUBLICATIONS

Korean Office Action dated Nov. 3, 2016, in counterpart Korean Application No. 10-2014-0111863 (5 pages in English, 4 pages in Korean).

(Continued)

*Primary Examiner* — Adi Amrany
(74) *Attorney, Agent, or Firm* — NSIP Law

(57) ABSTRACT

A non-contact type power supplying apparatus may be capable of detecting another power receiving apparatus even during the charging. The non-contact type power supplying apparatus may include: a first output unit outputting a detection signal detecting a power receiving apparatus; and a second output unit outputting a wake-up signal waking-up a communications circuit of the detected power receiving apparatus when the power receiving apparatus is detected, thereby making it possible to supply power to the detected power receiving apparatus using a non-contact type method.

11 Claims, 6 Drawing Sheets

(51) Int. Cl.
*H02J 50/80* (2016.01)
*H02J 50/60* (2016.01)
*H02J 17/00* (2006.01)
*H04B 5/00* (2006.01)
*H02J 7/00* (2006.01)

(52) U.S. Cl.
CPC ............ *H02J 50/80* (2016.02); *H04B 5/0037* (2013.01); *H04B 5/0081* (2013.01); *H02J 2007/0096* (2013.01)

(58) Field of Classification Search
USPC ........................................................ 307/104
See application file for complete search history.

(56) References Cited

U.S. PATENT DOCUMENTS

| | | | |
|---|---|---|---|
| 9,231,428 B2* | 1/2016 | Yoon | H02J 7/025 |
| 2009/0284082 A1 | 11/2009 | Mohammadian | |
| 2009/0284220 A1* | 11/2009 | Toncich | G06K 7/0008 |
| | | | 320/108 |
| 2010/0133917 A1* | 6/2010 | Sekino | H02J 7/025 |
| | | | 307/104 |
| 2010/0270867 A1 | 10/2010 | Abe | |
| 2012/0202435 A1 | 8/2012 | Kim et al. | |
| 2012/0223589 A1 | 9/2012 | Low et al. | |
| 2013/0082647 A1 | 4/2013 | Yoon et al. | |
| 2013/0127255 A1* | 5/2013 | Tsujimoto | H04B 5/0037 |
| | | | 307/104 |
| 2013/0154558 A1 | 6/2013 | Lee et al. | |
| 2013/0162051 A1 | 6/2013 | Michihata et al. | |
| 2014/0281534 A1* | 9/2014 | McCormack | H04L 63/0428 |
| | | | 713/168 |
| 2015/0054454 A1* | 2/2015 | White, II | H04B 5/0075 |
| | | | 320/108 |

FOREIGN PATENT DOCUMENTS

| | | |
|---|---|---|
| JP | 2013-115917 A | 6/2013 |
| KR | 10-2010-0116556 A | 11/2010 |
| KR | 10-2011-0009227 | 1/2011 |
| KR | 10-1255924 B1 | 4/2013 |
| WO | WO 2009/140217 | 11/2009 |

OTHER PUBLICATIONS

Extended European Search Report dated May 11, 2015 in corresponding European Patent Application No. 14275241.9.
Korean Office Action dated Feb. 5, 2016, in counterpart Korean Application No. 10-2014-0111863 (7 pages in English, 4 pages in Korean).

* cited by examiner

NON-CONTACT TYPE POWER SUPPLYING APPARATUS AND NON-CONTACT TYPE POWER SUPPLYING METHOD

CROSS-REFERENCE TO RELATED APPLICATIONS

This application claims the benefit of Korean Patent Application Nos. 10-2013-0141739 filed on Nov. 20, 2013, and 10-2014-0111863 filed on Aug. 26, 2014, with the Korean Intellectual Property Office, the disclosures of which are incorporated herein by reference.

BACKGROUND

The present disclosure relates to a non-contact type power supplying apparatus and a non-contact type power supplying method in which power is transmitted using a non-contact type method.

In order to supply external power to an electronic device, a power supplying apparatus may be necessary for transferring power from an external power outlet to the electronic device.

A wired-type power supplying apparatus directly connected to an electronic device via a connector, or the like, maybe used to supply power to a battery embedded in an electronic device. Alternatively, power may be supplied to the battery embedded in the electronic device using a non-contact type method through a magnetic induction effect or a magnetic resonance effect.

Meanwhile, as in the related art disclosed in the following Related Art Document, such a non-contact type power supplying apparatus may transmit a short beacon to detect an adjacent power receiving apparatus according to changes in impedance, and may transmit a long beacon to wake-up a communication circuit of the power receiving apparatus, communicate with the communication circuit of the power receiving apparatus, and then transmit power thereto.

However, since the above-mentioned short beacon and long beacon are simultaneously output, the changes in impedance may not be detected when another chargeable power receiving apparatus is located within a charging range during the charging.

RELATED ART DOCUMENT

Patent Document (Patent Document 1) Korean Patent Laid-Open Publication No. 10-2011-0009227

SUMMARY

An aspect of the present disclosure may provide a non-contact type power supplying apparatus and a non-contact type power supplying method capable of detecting another power receiving apparatus even during charging.

According to an aspect of the present disclosure, a non-contact type power supplying apparatus may include: a first output unit outputting a detection signal detecting a power receiving apparatus; and a second output unit outputting a wake-up signal waking-up a communications circuit of the detected power receiving apparatus when the power receiving apparatus is detected.

According to another aspect of the present disclosure, a non-contact type power supplying method may include: outputting a detection signal detecting a power receiving apparatus; continuously outputting the detection signal when the power receiving apparatus is detected and outputting a wake-up signal waking-up a communications circuit of the detected power receiving apparatus; and supplying power to the detected power receiving apparatus using a non-contact type method.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
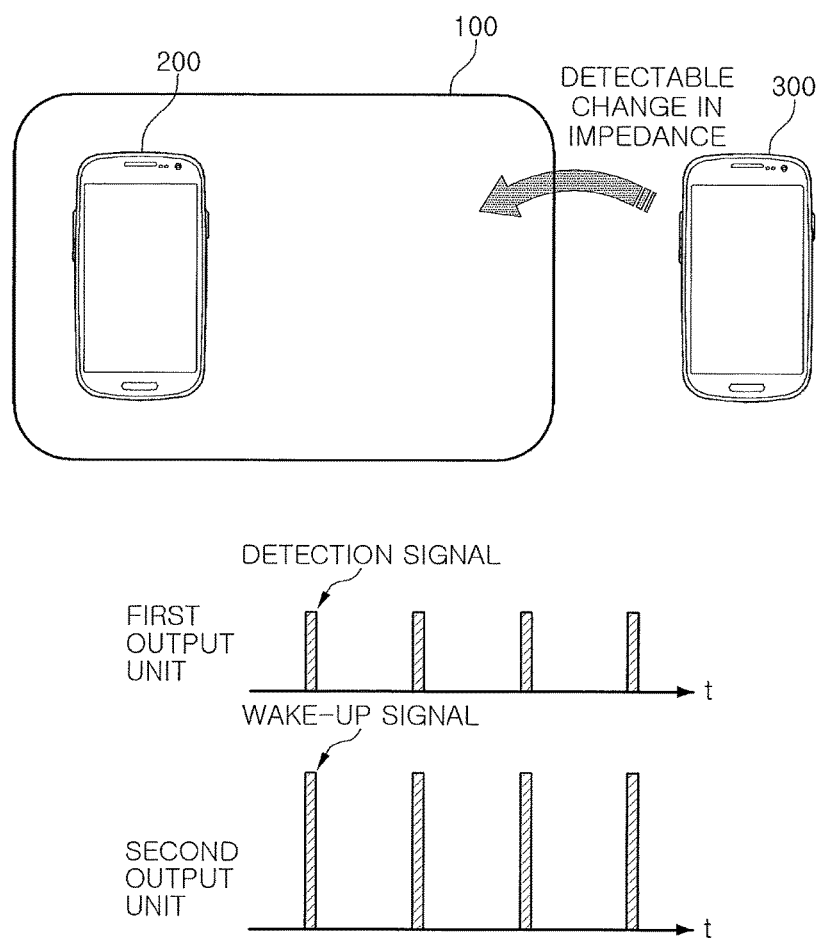
FIG. 1 is a diagram conceptually illustrating a charging method of a non-contact type charging apparatus according to an exemplary embodiment of the present disclosure.

Hereinafter, embodiments of the present disclosure will be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements maybe exaggerated for clarity, and the same reference numerals will be used throughout to designate the same or like elements.

FIG. 1 is a diagram conceptually illustrating a charging method of a non-contact type charging apparatus according to an exemplary embodiment of the present disclosure.

Referring to FIG. 1, a non-contact type charging apparatus 100 according to an exemplary embodiment of the present disclosure may detect that a power receiving apparatus has approached by varying impedance of a power transmitting coil of a first output unit which outputs a detection signal if a power receiving apparatus such as a smartphone, a tablet personal computer (PC), or the like, has approached a charging surface of the non-contact type charging apparatus 100.

In the case in which a object has approached the charging surface, the approach of the object may be detected by the detection signal, but required power may be supplied using a non-contact type method by outputting a wake-up signal which wakes-up a communications circuit of the power receiving apparatus and communicating with the communications circuit of the woken-up power receiving apparatus in order to determine whether or not the detected object is the power receiving apparatus. Here, the non-contact method may refer to a method in which power is transmitted without using a direct connection between conductors on a power transmitting side and a power receiving side during a process in which the power is transmitted from the power transmitting side to the power receiving side, and in other words, refer to a contactless electrical power transmitting method, a wireless electrical power transmitting method, or the like.

In general, since the detection signal and the wake-up signal are output from a single output unit, changes in impedance may not be detected even in the case that further chargeable power receiving apparatuses come into charging range during the charging process.

However, the non-contact type charging apparatus 100 according to an exemplary embodiment of the present disclosure may detect an approach of a further power receiving apparatus 300 by detecting changes in impedance even though the further power receiving apparatus 300 has approached during a process in which power is supplied to one power receiving apparatus 200 having approached a charging surface.

To this end, the first output unit of the non-contact type charging apparatus 100 according to an exemplary embodiment of the present disclosure may output the detection signal and a second output unit may output the wake-up signal.

Figure 2:
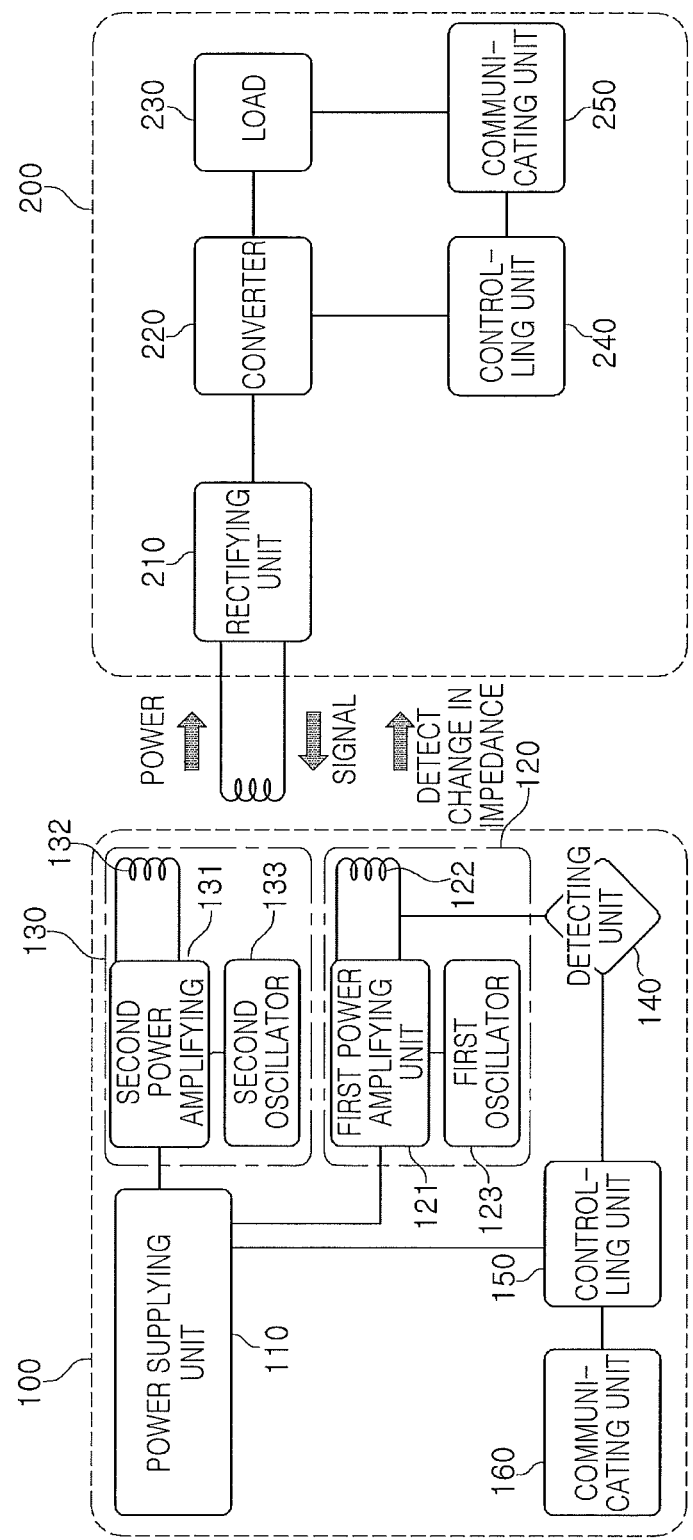
FIG. 2 is a schematic block diagram of the non-contact type charging apparatus according to an exemplary embodiment of the present disclosure.

FIG. 2 is a schematic block diagram of the non-contact type charging apparatus according to an exemplary embodiment of the present disclosure.

Referring to FIG. 2, the non-contact type charging apparatus 100 according to an exemplary embodiment of the present disclosure may include a power supplying unit 110, a first output unit 120, a second output unit 130, a detecting unit 140, a controlling unit 150, and a communicating unit 160.

The power supplying unit 110 may supply power to the first output unit 120 and the second output unit 130.

To this end, the power supplying unit 110 may convert alternating current power into direct current power and supply the converted direct current power to the first output unit 120 and the second output unit 130.

The first output unit 120 may include a first power amplifying unit 121, a first power transmitting coil 122, and a first oscillator 123.

The first power amplifying unit 121 may amplify power from the power supplying unit 110 and may generate the detection signal in response to an oscillating signal from the first oscillator 123.

The first power transmitting coil 122 may transmit the detection signal from the first power amplifying unit 121 to the exterior thereof.

The first power amplifying unit 121 may generate the detection signal in response to a control from the controlling unit 150, and a signal level of the detection signal may be varied.

For example, power consumption may be decreased by detecting an approach of the power receiving apparatus even at a low signal level by sequentially varying the signal level of the detection signal at a predetermined period.

The second output unit 130 may include a second power amplifying unit 131, a second power transmitting coil 132, and a second oscillator 133.

The second power amplifying unit 131 may amplify power from the power supplying unit 110 and may generate the wake-up signal in response to an oscillating signal from the second oscillator 133.

The second power transmitting coil 132 may transmit the wake-up signal from the second power amplifying unit 131 to the exterior thereof.

The second power amplifying unit 131 may generate the wake-up signal in response to a control from the controlling unit 150, and a signal level of the wake-up signal may be varied.

For example, power consumption may be decreased by waking-up the communications circuit of the power receiving apparatus even at a low signal level by sequentially varying the signal level of the wake-up signal at a predetermined period.

If the communications circuit of the power receiving apparatus is woken-up, the communicating unit 160 and the communications circuit of the power receiving apparatus communicate with each other, and it is then determined that the power receiving apparatus is a suitable power receiving apparatus, the second output unit 130 may transmit power to the exterior thereof through the second power transmitting coil 132 according to the control of the controlling unit 150.

The detecting unit 140 may detect an impedance variation of the first power transmitting coil 122 of the first output unit 120 and may transmit the detection result to the controlling unit 150.

The controlling unit 150 may transmit the wake-up signal by controlling the second output unit 130 in the case in which an object has approached the charging surface, according to the detection result from the detecting unit 140.

That is, the first output unit 120 may only output the detection signal at a predetermined interval, and the second output unit 130 may output the wake-up signal according to the control of the controlling unit 150 in the case in which the object has approached the charging surface.

The communicating unit 160 may receive and communicate a response from the communications circuit of the woken-up power receiving apparatus to thereby receive information about necessary power, and the controlling unit 150 may transmit power which is required by the power receiving apparatus in the non-contact manner by controlling the second output unit 130 according to the information from the communicating unit 160.

In this case, the first output unit 120 may maintain an output of the detection signal having a predetermined interval.

Meanwhile, the power receiving apparatus 200 may include a rectifying unit 210, a converter 220, a load 230, a controlling unit 240, and a communicating unit 250.

The rectifying unit 210 may rectify the received power, and the converter 220 may convert the rectified power into power necessary for the load 230.

Here, the load 230 may be a battery of the power receiving apparatus 200.

The controlling unit 240 may request the necessary power through the communicating unit 250, and may control power reception by controlling an operation of the converter 220 or the rectifying unit 210.

The communicating unit 250 may be woken-up in response to the wake-up signal during a sleep mode and may send a response to the non-contact type charging apparatus 100. In addition, the communicating unit 250 may transmit information about the necessary power.

The communicating unit 250 may support various communications schemes such as Bluetooth, Zigbee, Wi-Fi, near field communication, and the like.

Figure 3A:
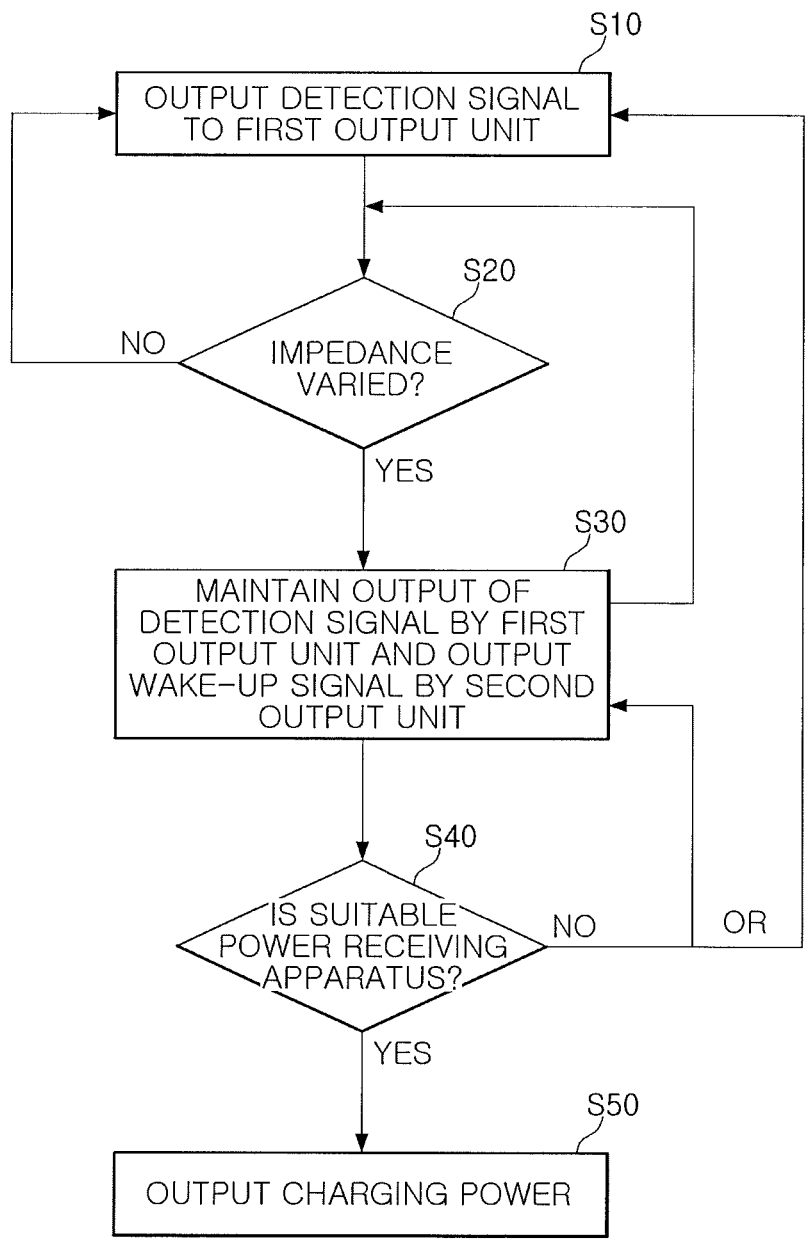
FIGS. 3A and 3B are flowcharts schematically illustrating a non-contact type power charging method according to an exemplary embodiment of the present disclosure.
Figure 3B:
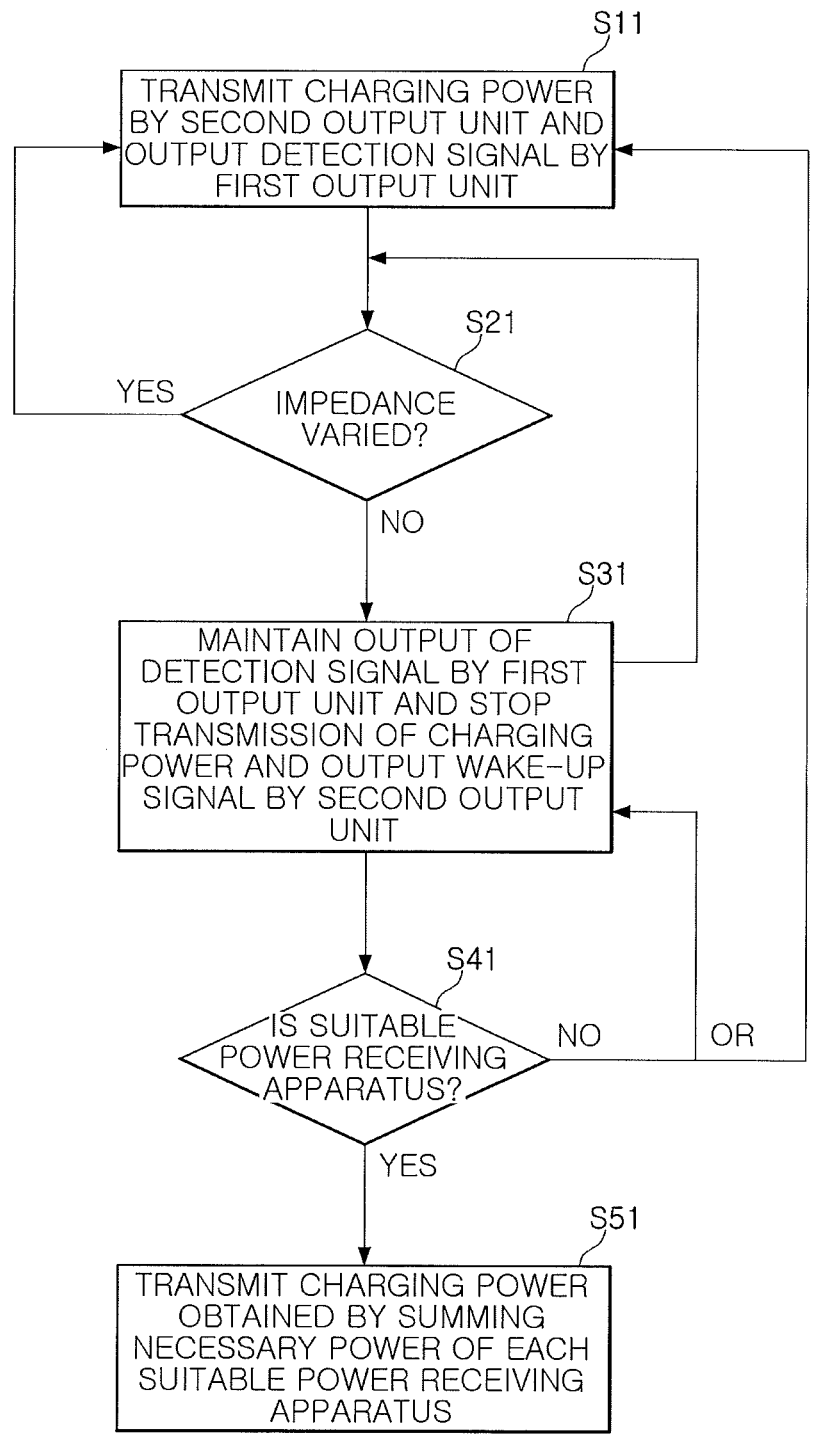
Figure 4A:
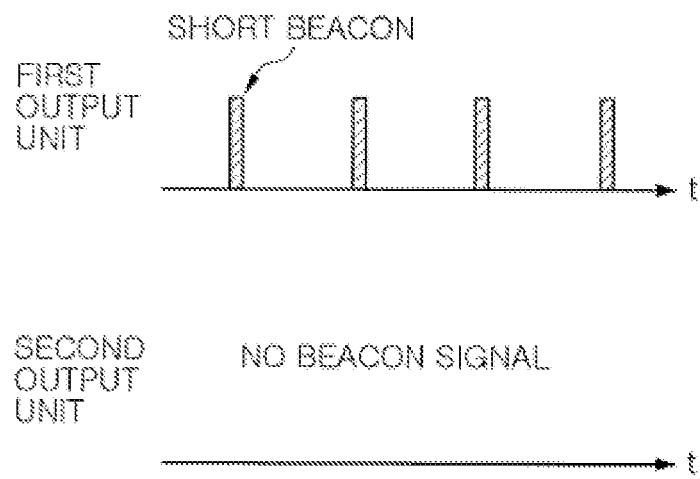
FIGS. 4A, 4B, and 4C are diagrams illustrating output signals of the non-contact type charging apparatus according to an exemplary embodiment of the present disclosure.
Figure 4B:
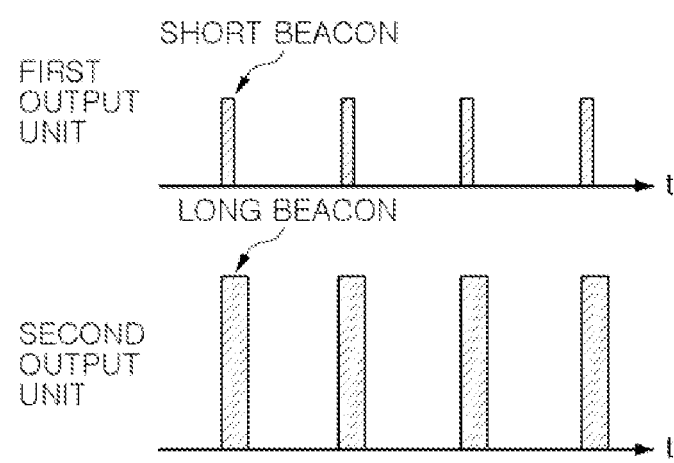
Figure 4C:
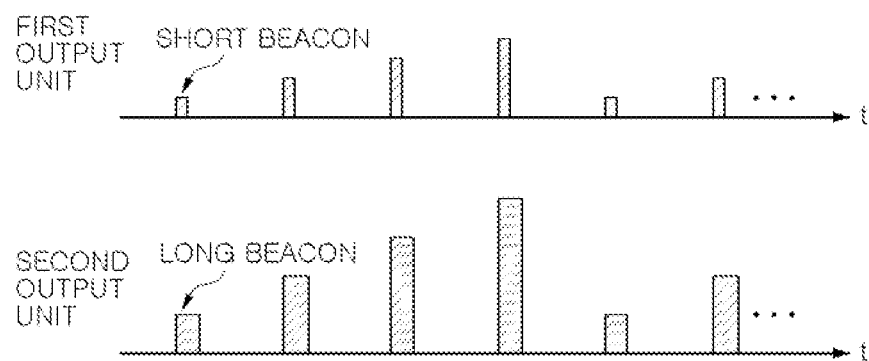

FIGS. 3A and 3B are flowcharts schematically illustrating a non-contact type power charging method according to an exemplary embodiment of the present disclosure and FIGS. 4A, 4B, and 4C are diagrams illustrating output signals of the non-contact type charging apparatus according to an exemplary embodiment of the present disclosure.

First, referring to FIGS. 2 and 3A, the first output unit 120 may output the detection signal at the predetermined interval to detect the approach of the object to the non-contact type charging apparatus 100.

The detection signal may be a short beacon.

As shown in FIG. 4A, while the first output unit 120 detects the approach of the object, the second output unit 130 may be operated in a sleep mode without outputting a signal.

Next, if the detecting unit 140 detects the impedance variation of the first power transmitting coil 122 of the first output unit 120 (S20), when the impedance variation detected by the detecting unit 140 is a predetermined reference or more, the controlling unit 150 may perform a control so that the necessary power is supplied to the second output unit 130 by controlling the power supplying unit 110, and the second output unit 130 may output the wake-up signal having the predetermined interval according to the control of the controlling unit 150.

The wake-up signal may be a long beacon.

In this case, as shown in FIG. 4B, the second output unit 130 may output the long beacon signal and the first output unit 120 may maintain an output of the short beacon in order to detect an approach of the other object to the non-contact type charging apparatus 100 (S30).

In the case in which the communicating unit 250 of the power receiving apparatus 200 wakes-up from the sleep mode according to the long beacon of the second output unit 130, the communicating unit 250 of the power receiving apparatus 200 may transmit a response to the non-contact type charging apparatus 100 and may transmit the information about the necessary power to the non-contact type charging apparatus 100 according to the control of the controlling unit 240.

The controlling unit 150 of the non-contact type charging apparatus 100 may determine that the power receiving apparatus is a suitable power receiving apparatus according to the response (S40).

The communicating unit 160 of the non-contact type charging apparatus 100 may transmit the information from the communicating unit 250 of the power receiving apparatus 200 to the controlling unit 150, and the controlling unit 150 may perform a control so that the necessary power is transmitted to the power receiving apparatus 200 in the non-contact manner by controlling the power supplying unit 110 and the second output unit 130 (S50).

Meanwhile, the non-contact type charging apparatus 100 may detect an approach of a further power receiving apparatus while it transmits charging power to the power receiving apparatus 200.

Referring to FIG. 3B, the second output unit 130 may transmit the charging power and the first output unit 120 may output the detection signal (S11).

In this case, if the impedance variation is detected due to another power receiving apparatus which is approached (S21), the second output unit 130 may stop the transmission of the charging power and may output the wake-up signal. The first output unit 120 may continuously output detection signal (S31).

In the case in which a communicating unit of another power receiving apparatus wakes-up from the sleep mode according to the wake-up signal of the second output unit 130, the communicating unit of another power receiving apparatus may transmit a response to the non-contact type charging apparatus 100 and may transmit the information about the necessary power to the non-contact type charging apparatus 100 according to a control of a controlling unit of another power receiving apparatus.

The controlling unit 150 of the non-contact type charging apparatus 100 may determine that the power receiving apparatus is a suitable power receiving apparatus according to the response (S41).

Next, the communicating unit 160 of the non-contact type charging apparatus 100 may transmit the information from the communicating unit of another power receiving apparatus to the controlling unit 150, and the controlling unit 150 may perform a control so that charging power obtained by summing a power level of the charging power which is previously transmitted to the power receiving apparatus 100 and power necessary for another power receiving apparatus is transmitted to the power receiving apparatus 200 and another power receiving apparatus in the non-contact manner by controlling the power supplying unit 110 and the second output unit 130 (S51).

Meanwhile, since the non-contact type charging apparatus 100 according to an exemplary embodiment of the present disclosure includes the first output unit 120 and the second output unit 130, power consumption may be increased.

Therefore, as shown in FIG. 4C, since power receiving apparatus having a high coupling coefficient with the non-contact type charging apparatus 100 may easily perform the detection or the wake-up even at a low level by sequentially varying the signal level of the detection signal or the wake-up signal, the power consumption may be suppressed.

In other words, when the coupling coefficient between the non-contact type charging apparatus and the power receiving apparatus is large due to the power receiving apparatus being in the correct position, etc., the power receiving apparatus can detect the approach of the power receiving apparatus even if the level of the detection signal is low, and can wake-up the communicating unit of the power receiving apparatus even if the level of the wake-up signal. That is, when the coupling coefficient is large, high level detection signals and high level wake-up signals are not output. Only if the coupling coefficient is small (i.e., the approach of the power receiving apparatus is not detected with the low level detection signals, and/or the communicating unit of the power receiving apparatus is not waken-up with low level wake-up signals), high level detection signals and/or high level wake-up signals are output. Therefore, according to the exemplary embodiments, it is possible, it is possible to prevent an unnecessarily high level detection signal and/or wake-up signal from being outputted, thereby the power consumption can be suppressed.

As described above, according to the present disclosure, a further power receiving apparatus may be easily detected and charged even in the case that a further power receiving apparatus has approached while one power receiving apparatus is charged.

As set forth above, according to exemplary embodiments of the present disclosure, other power receiving apparatuses may be detected even during the charging.

While exemplary embodiments have been shown and described above, it will be apparent to those skilled in the art that modifications and variations could be made without departing from the scope of the present invention as defined by the appended claims.

What is claimed is:

1. A non-contact type power supplying apparatus comprising:
a first transmitting coil configured to output a detection signal through the first transmitting coil, wherein the detection signal is a plurality of discrete pulses;

a second output comprising a second transmitting coil and configured to output a wake-up signal through the second transmitting coil or transmit power through the second transmitting coil using a non-contact type method, wherein the wake-up signal is a plurality of discrete pulses; and a controller configured to determine whether or not a first object has approached by using a variation of an impedance of the first transmitting coil, control the second output to output the wake-up signal, determining whether or not an approached first object is a first power receiving apparatus by using a first response signal outputted from the approached first object in response to the wake-up signal, control the second output to transmit power to the first power receiving apparatus when the approached first object is determined to be the first power receiving apparatus, determine whether or not a second object has approached by using a variation of the impedance of the first transmitting coil while the second output transmits the power to the first power receiving apparatus, and control the second output to stop the transmission of the power and output the wake-up signal when it is determined that the second object has approached, wherein the amplitude of either one or both of the detection signal pulses and the wake-up single pulses varies sequentially from a low level to a high level, and wherein the first output outputs the detection signal while the second output transmits the power to the first power receiving apparatus.

2. The non-contact type power supplying apparatus of claim 1, wherein the detection signal is a short beacon having a predetermined interval.

3. The non-contact type power supplying apparatus of claim 1, wherein the wake-up signal is a long beacon having a predetermined interval.

4. The non-contact type power supplying apparatus of claim 1, wherein the first output further includes:
a first power amplifier configured to amplify input power to generate the detection signal according to a first oscillating signal; and
a first oscillator configured to provide the first oscillating signal to the first power amplifier.

5. The non-contact type power supplying apparatus of claim 4, wherein the second output unit includes:
a second power amplifier configured to amplify input power to generate the wake-up signal according to a second oscillating signal; and
second oscillator configured to provide the second oscillating signal to the second power amplifier.

6. The non-contact type power supplying apparatus of claim 1, further comprising:
a power supplier configured to supply power to the first output and the second output;
a detecting configured to detect changes in impedance of the first transmission coil; and
a communicator configured to receive the first response signal.

7. The non-contact type power supplying apparatus of claim 1, wherein the controller determines whether or not an approached second object is a second power receiving apparatus by using a second response signal outputted from the approached second object in response to the wake-up signal, and controls the second output to transmit power which is obtained by summing power which is requested by the first power receiving apparatus and power which is requested by the second power receiving apparatus to the first power receiving apparatus and the second power receiving apparatus when the approached second object is determined to be the second power receiving apparatus.

8. A non-contact type power supplying method comprising:
outputting a detection signal through a first transmitting coil, wherein the detection signal is a plurality of discrete pulses;
determining whether or not a first object has approached by using a variation of an impedance of the first transmitting coil;
outputting a wake-up signal through a second transmitting coil, wherein the wake-up signal is plurality of discrete pulse;
determining whether or not an approached first object is a first power receiving apparatus by using a first response signal outputted from the approached first object in response to the wake-up signal;
when the approached first object is determined to be the first power receiving apparatus, supplying power to the first power receiving apparatus through the second transmitting coil in the non-contact manner and outputting the detection signal through the first transmitting coil;
determining whether or not a second object has approached by using the variation of an impedance of the first transmitting coil; and
stopping the transmission of the power to the first power receiving apparatus and outputting the wake-up signal through the second transmitting coil when it is determined that the second object has approached,
wherein the amplitude of either one or both of the detection signal pulses and the wake-up signal pulses varies sequentially from a low level to a high level.

9. The non-contact type power supplying method of claim 8, wherein the detection signal is a short beacon having a predetermined interval.

10. The non-contact type power supplying method of claim 8, wherein the wake-up signal is a long beacon having a predetermined interval.

11. The non-contact type power supplying method of claim 8, further comprising:
determining whether or not an approached second object is a second power receiving apparatus by using a second response signal outputted from the approached second object in response to the wake-up signal;
when the approached second object is determined to be the second power receiving apparatus, supplying power which is obtained by summing power which is requested by the first power receiving apparatus and power which is requested by the second power receiving apparatus to the first power receiving apparatus and the second power receiving apparatus.

* * * * *